(12) United States Patent
Arnold et al.

(10) Patent No.: US 7,287,547 B2
(45) Date of Patent: Oct. 30, 2007

(54) INLET OR OUTLET VALVE FOR A PUMP

(75) Inventors: Bernhard Arnold, Roden-Ansbach (DE); Marc Hohmann, Marktheidenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/886,212

(22) Filed: Jul. 7, 2004

(65) Prior Publication Data
US 2004/0238043 A1 Dec. 2, 2004

Related U.S. Application Data

(63) Continuation of application No. PCT/DE02/04752, filed on Dec. 30, 2002.

(30) Foreign Application Priority Data

Jan. 7, 2002 (DE) ................. 102 00 275

(51) Int. Cl.
*F16K 15/06* (2006.01)
*F16K 21/10* (2006.01)
(52) U.S. Cl. .................... 137/543; 137/514.5
(58) Field of Classification Search ............. 137/514.5, 137/514.7, 543; 417/569, 571
See application file for complete search history.

(56) References Cited

U.S. PATENT DOCUMENTS

| | | | |
|---|---|---|---|
| 620,676 A * | 3/1899 | Sanderson et al. .......... 137/543 |
| 784,534 A * | 3/1905 | Bassett ........................ 137/543 |
| 1,086,549 A * | 2/1914 | Miller ......................... 137/543 |
| 1,867,585 A | 7/1932 | Moore | |
| 2,649,277 A | 8/1953 | Blackford ................... 251/144 |
| 2,973,008 A * | 2/1961 | Klose .......................... 137/543 |
| 3,474,808 A | 10/1969 | Elliott ......................... 137/543 |
| 3,584,644 A | 6/1971 | Morken ....................... 137/426 |
| 3,610,276 A * | 10/1971 | Seelman et al. .......... 137/514.5 |
| 3,810,716 A | 5/1974 | Abrahams et al. .......... 417/313 |
| 3,995,658 A * | 12/1976 | Hager .......................... 137/543 |
| 4,187,059 A | 2/1980 | Parker et al. ................ 417/454 |
| 4,203,466 A * | 5/1980 | Hager .......................... 137/543 |
| 4,391,283 A | 7/1983 | Sharpless et al. ........... 128/725 |
| 4,535,808 A * | 8/1985 | Johanson et al. ........... 137/543 |
| 4,766,929 A | 8/1988 | Yaindl ...................... 137/514.3 |
| 4,768,932 A | 9/1988 | Geberth, Jr. ................. 417/552 |
| 4,862,913 A * | 9/1989 | Wildfang .................... 137/543 |
| 5,195,552 A * | 3/1993 | Nehm ......................... 137/543 |

(Continued)

FOREIGN PATENT DOCUMENTS

DE     43 21 800 A1     1/1994

(Continued)

OTHER PUBLICATIONS

PCT/DE02/03166 International Search Report, 7 pages, Mailed Jul. 17, 2003.

(Continued)

*Primary Examiner*—John Rivell
(74) *Attorney, Agent, or Firm*—Baker Botts L.L.P.

(57) ABSTRACT

An inlet or outlet valve for a pump comprises a closing body (3) pretensioned by a spring element (4). The closing body (3) can open or close a passage on a valve seat (2). The valve also comprises a guide element (5) for guiding the closing body (3). Inside the guide element (5), the closing body (3) is guided at least on a first guiding area (9) and a second guiding area (10).

11 Claims, 3 Drawing Sheets

U.S. PATENT DOCUMENTS

| | | | |
|---|---|---|---|
| 5,226,799 A * | 7/1993 | Raghavan et al. | 417/569 |
| 5,370,150 A * | 12/1994 | Nehm | 137/543 |
| 5,507,312 A | 4/1996 | Dillman | 137/533.15 |
| 5,636,975 A | 6/1997 | Tiffany et al. | 417/454 |
| 5,921,276 A | 7/1999 | Lam et al. | 137/514.7 |

FOREIGN PATENT DOCUMENTS

| | | |
|---|---|---|
| DE | 43 25 688 A1 | 2/1994 |
| DE | 197 41 249 A1 | 3/1999 |
| DE | 197 44 577 A1 | 4/1999 |
| GB | 409028 | 4/1934 |
| GB | 744858 | 2/1956 |

OTHER PUBLICATIONS

PCT/DE02/04752 International Search Report, 7 pages, Mailed Apr. 20, 2004.

* cited by examiner

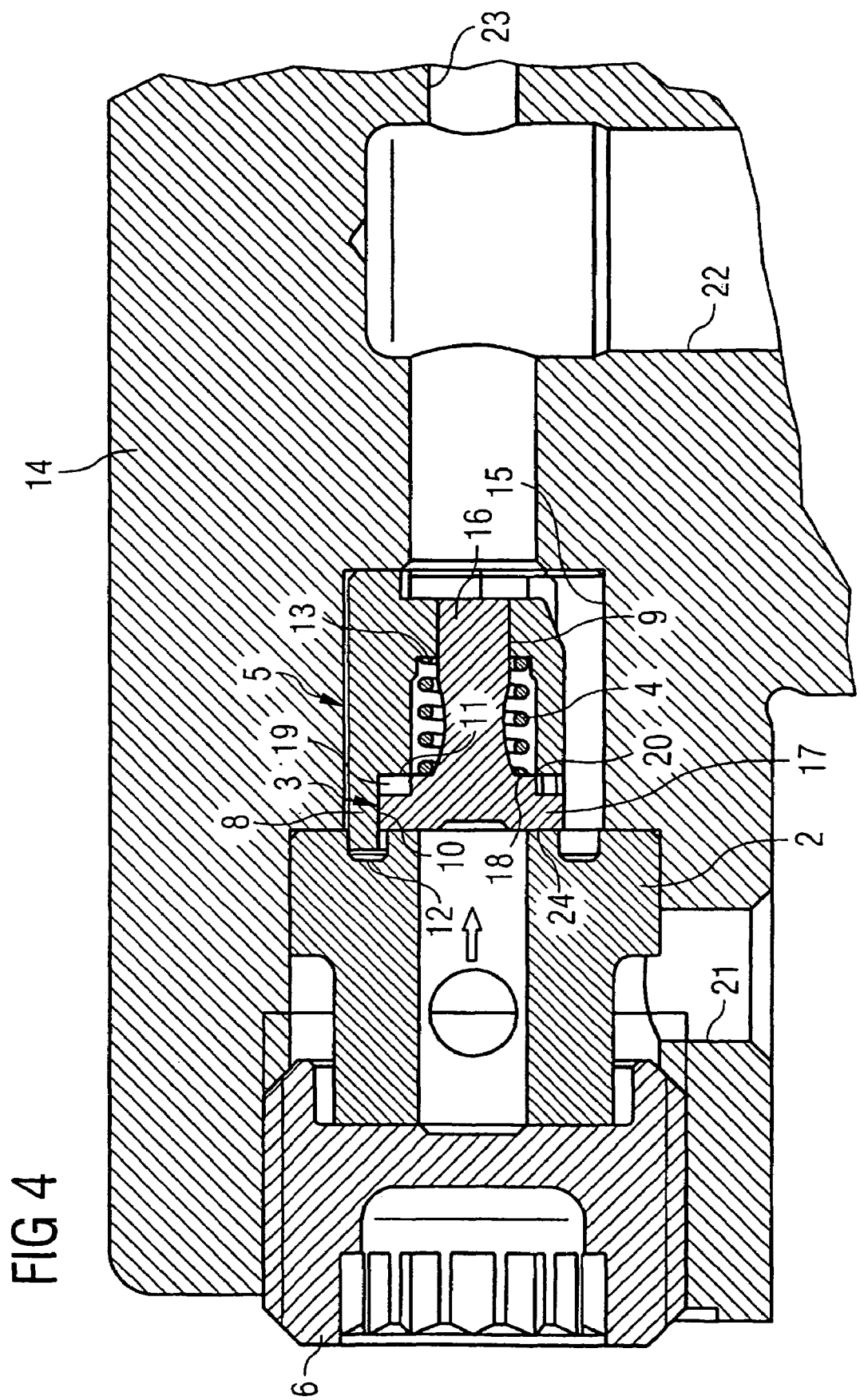

INLET OR OUTLET VALVE FOR A PUMP

CROSS REFERENCE TO RELATED APPLICATION

This application is a continuation of copending International Application No. PCT/DE02/04752 filed Dec. 30, 2002 which designates the United States, and claims priority to German application no. 102 00 275.4 filed Jan. 7, 2002.

TECHNICAL FIELD OF THE INVENTION

The present invention relates to an inlet or outlet valve for a pump.

DESCRIPTION OF THE RELATED ART

Inlet or outlet valves for pumps are known in various embodiments. For example, DE 197 44 577 A1 shows a radial piston pump for high-pressure fuel delivery that has a spring-loaded inlet valve. The inlet valve is arranged in a plate provided with a transverse hole through which fuel can flow during the induction stroke via the opened inlet valve. The inlet valve is also arranged in a recess in a screw plug. The closing body is substantially T-shaped, and a cylindrical section of the closing body is guided in a flange sleeve that is arranged loosely in the recess in the screw plug and doubles as a spring seat for a return spring in the inlet valve.

A return valve having an axial inlet and radial outlet holes is known from DE 43 21 800 C2. The valve comprises a closing body that is guided in a guide element allowing movement in an axial direction, and is guided in an upper end area and a second area, approximately in the center of the closing body. The closing body is arranged in the end area containing the valve seat in such a way that the closing body can be elastically deformed in this area in a radial direction.

In the known axial-flow inlet valves (check valves) of high-pressure pumps it is difficult to guide the closing body precisely because the closing body is seated in a free-moving flange sleeve. This means that the closing body can become skewed out of line, having a negative impact on seat wear and the operation of the inlet valve, in particular when the pump is running at high speeds. In addition, the transfer flow through inlet valves having an axial flow direction is often achieved with an unsatisfactory solution and leads to additional losses.

SUMMARY OF THE INVENTION

It is therefore the object of the present invention to provide an inlet or outlet valve for a pump that can, with a simple design that is also simple and cheap to manufacture, in particular effectively prevent the closing body from becoming skewed out of line.

This object can be achieved by an inlet or outlet valve for a pump, comprising a closing body, pre-tensioned by a spring element, that can open or close a passage on a valve seat, and a guide element, the closing body being guided inside the guide element at least on a first guide area at an upper end region and on a second guide area, wherein the closing body is guided in a lower end region in the direction of movement of the closing body, and the valve is designed and arranged in such a way that it has a transfer flow in the axial direction.

The guide element can be made of plastic. The guide element can be connected to the valve seat by means of a press fit. The guide element can be mounted in a recess formed in the valve seat. The guide element can be mounted in the recess of the valve seat by means of a friction fit. The guide element may have a cylindrical region having at least two arms integrally formed thereon. The guide element may have an end-stop surface for a limit of travel of the closing body. The guide element may have a spring seat, the spring seat providing at the same time a means of centering the spring element. The guide element may have three arms, so that a transfer port in the axial direction is formed between each pair of adjacent arms. At least one guide area may have a cylindrical construction. At least one guide area may have a convex construction. The valve seat can be designed as a flat seat. The closing body may have a cylindrical shaft that is guided by one of the guide areas. The closing body may have a flat sealing head that is guided along its sides by one of the guide areas. The closing body may have a sealing head that has a tapered, in particular conical design. An additional annular step can be formed on the closing body in such a way that a fuel-filled chamber is formed between the step and the end-stop surface of the guide element for hydraulic damping of a movement of the closing body. The valve can be used as an inlet valve in a piston pump, in particular in a piston fuel pump.

The axial-flow inlet or outlet valve according to the invention to be used with a pump comprises a closing body, pre-tensioned by a spring element, that can open or close a passage on a valve seat. In addition, the valve comprises a guide element for guiding the closing body. According to the invention, the closing body is guided inside the guide element at least on a first guide area at its upper end region and on a second guide area at its lower end region. By the closing body being guided according to the invention at an upper and a lower end of the closing body, the two guide areas of the closing body are separated as far as possible from each other, so that precise and reliable guidance of a closing body can be achieved in an axial-flow valve for the first time. It is also a reliable means of preventing the closing body from becoming skewed out of line during the opening and closing movement, thereby avoiding unwanted edge stress for the closing body when the closing body comes to rest on the valve seat or against an end-stop surface. In particular this can prevent damage to other valve components so that the valve according to the invention has a particularly long working life. The valve according to the invention is particularly preferred for use in a fuel pump and in particular in a piston fuel pump. Since very high pressures need to be generated by the fuel pump for reservoir injection systems in particular, the dual guidance of the closing body can reliably prevent skewing e.g. during closure of the valve.

In order to enable the guide element to be manufactured simply and cheaply, the guide element is preferably made of plastic, and particularly preferably is manufactured by means of injection molding. This ensures not only machinability of the guide element but also that the guide element made of plastic can be manufactured cheaply with high production tolerances. In addition, this means that the stresses introduced in the guide element by manufacture and assembly can be reduced to a large extent.

In order to enable simple pre-assembly of the valve according to the invention, the guide element is preferably connected to the valve seat by means of a press fit. For pre-assembly, the closing body is here obviously first arranged with the spring element in the guide element, and then the guide element mounted on the valve seat.

The guide element can then be mounted on the valve seat particularly simply if the guide element can be mounted in a groove formed in the valve seat. It is particularly preferable in this case if the guide element is mounted with a friction fit in the groove of the valve seat.

The guide element is preferably designed as a sleeve having at least two arms integrally formed thereon. This produces a valve with a particularly simple design that in particular enables good transfer flow in the axial direction, yet the valve according to the invention can still be very compact in construction, in particular in the axial direction.

In order to minimize the number of parts, an end-stop surface is preferably formed on the guide element that constitutes a limit of travel for the closing body.

It is particularly preferable if the end-stop surface of the guide element doubles as the seat for the spring element, where the end-stop surface can additionally also ensure that the spring element is centered.

According to a particularly preferred embodiment of the present invention, the guide body is made up of a cylindrical region and three arms, so that three transfer ports are formed on the guide element in the axial direction, each lying between two adjacent arms.

It is particularly preferable if one of the two guide areas on the guide element has a cylindrical construction. This enables a long guide section for this first guide area.

According to another preferred embodiment of the present invention, one of the two guide areas has a convex construction, the convex shape of the guide area preventing a guide shaft of the closing body from tilting out of line.

It is also preferred for the valve seat to be designed as a flat seat. The closing body is then preferably designed with a flat sealing head so that a particularly reliable seal can be achieved. In addition, the closing body preferably has a cylindrical guide shaft so that a long first guide section is formed on the closing body.

According to another preferred embodiment of the present invention, the sealing head of the closing body has a tapered, in particular conical design.

In addition, in order to provide hydraulic damping when the valve is opened, an additional step is preferably formed on the closing body, so that hydraulic fluid is arranged in a chamber between the closing body and the guide element. When the valve is opened, the hydraulic fluid is forced out through the gap present between the additional step and the guide element, producing hydraulic damping.

The valve according to the invention is used particularly preferably as an inlet valve in a piston fuel pump. Results from trials have shown here that the valve having the closing body with dual guidance at its two end regions has a distinctly longer working life than hitherto known inlet valves in piston pumps. By providing integral hydraulic damping, the working life of the valve can be extended even further. It should be mentioned that the valve according to the invention can also be used in particular with other pumps having intermittent delivery such as membrane pumps or the like.

BRIEF DESCRIPTION OF THE DRAWINGS

The present invention is described below with reference to the accompanying drawings, in which FIG. 4 shows a cross-sectional view of a valve according to a second exemplary embodiment of the present invention.

DETAILED DESCRIPTION OF THE PREFERRED EMBODIMENTS

An inlet valve according to a first exemplary embodiment of the present invention is described below with reference to FIGS. 1 to 3. The inlet valve shown in FIGS. 1 to 3 is used in a radial piston pump that delivers fuel for a reservoir injection system.

Figure 1:
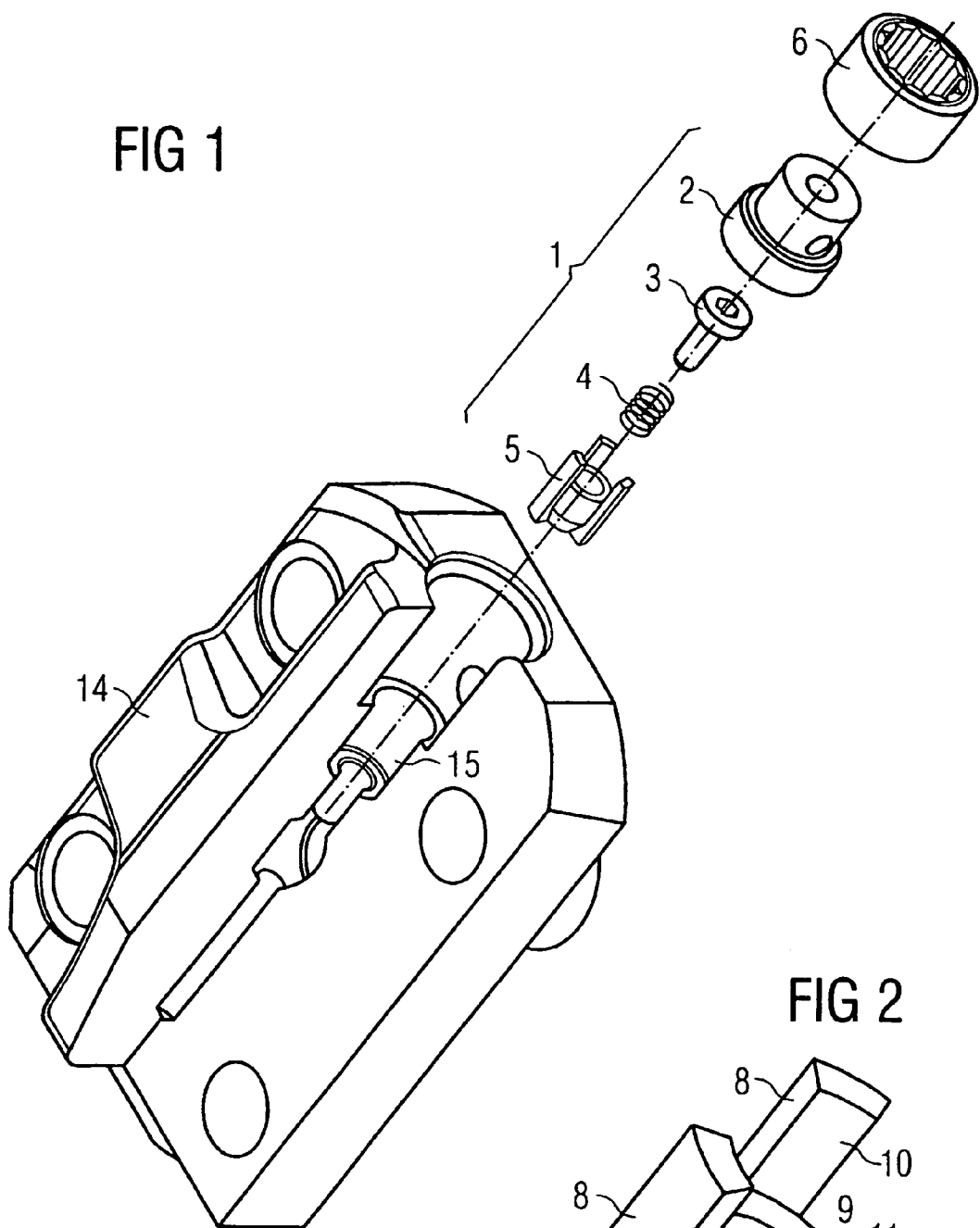
FIG. 1 shows an explosion diagram in perspective view of an inlet valve for a piston pump according to a first exemplary embodiment of the present invention.

As shown in FIG. 1 in particular, the valve 1 according to the invention comprises a valve seat 2, a closing body 3, a spring element 4 and a guide element 5, where the valve 1 according to the invention is designed such that the aforementioned individual parts can be pre-assembled and then arranged in the pre-assembled state in a recess 15 in a housing 14 of the pump. The pre-assembled valve 1 is fixed in the housing 14 by means of a screw plug 6.

Figure 2:
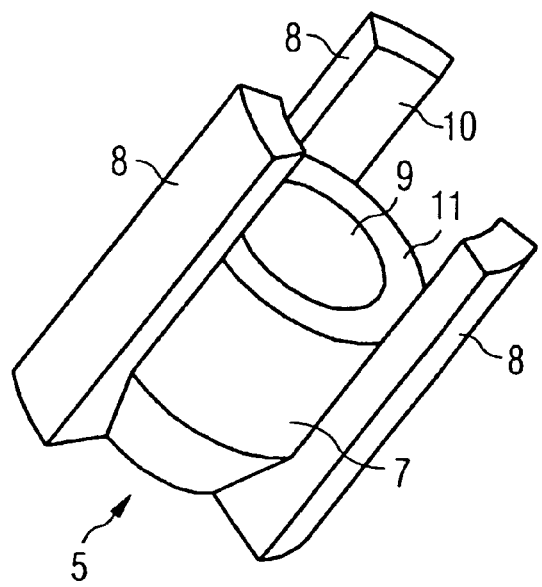
FIG. 2 shows an explosion diagram in perspective view of a guide element according to the first exemplary embodiment of the present invention.

FIG. 2 shows the guide element 5 in detail. As shown in FIG. 2, the guide element 5 comprises a cylindrical region 7 having an internal through hole and three arms 8 integrally formed around the outer circumference of the cylindrical region 7. The guide element 5 is preferably made of plastic by injection molding. The guide element 5 has a first guide area 9 inside the cylindrical region 7, and a second guide area 10 formed by the inner faces of the three arms 8.

Figure 3:
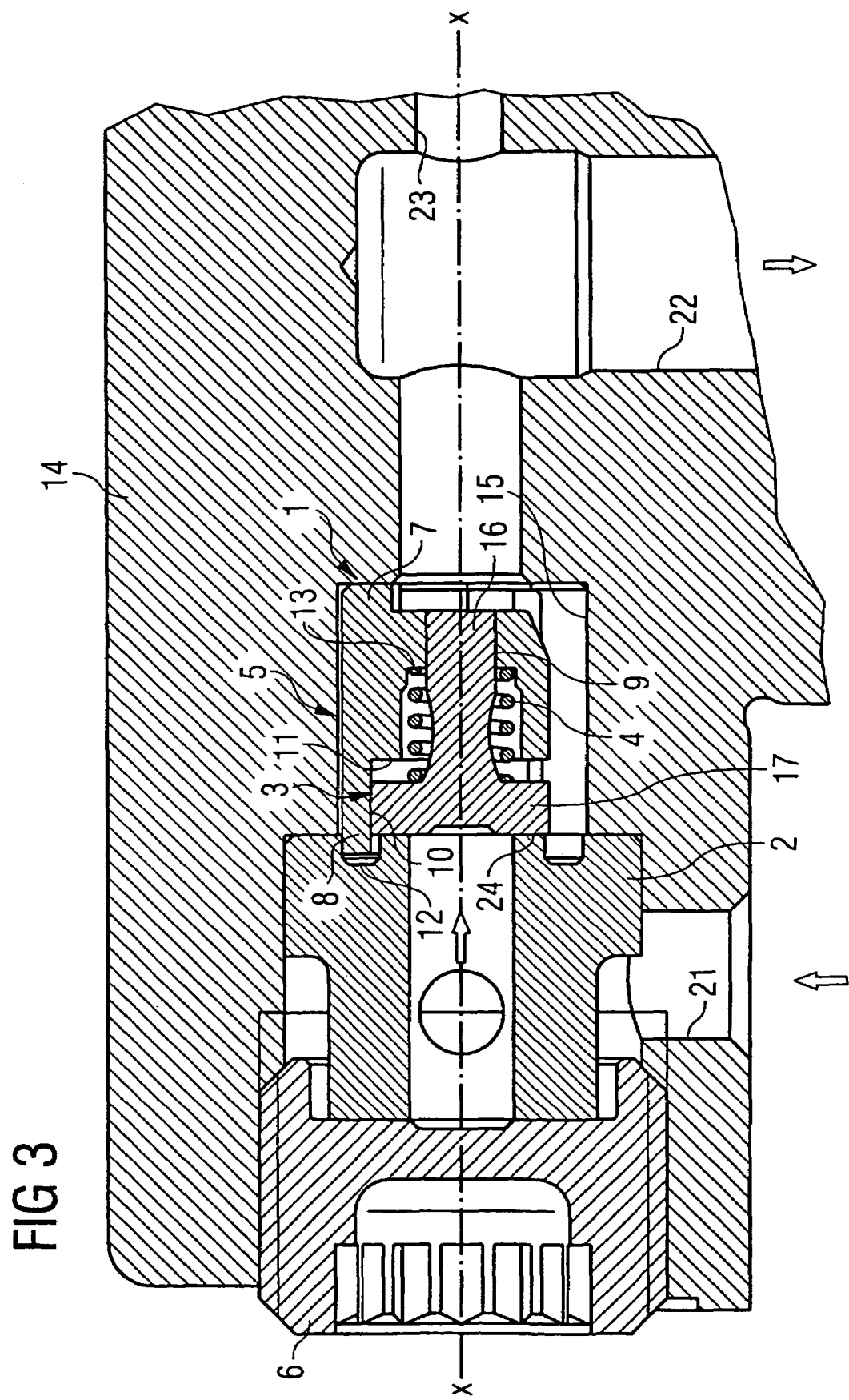
FIG. 3 shows a cross-sectional view of the assembled valve according to the first exemplary embodiment of the present invention.

FIG. 3 shows the valve 1 in its assembled state. As can be seen in FIG. 3, the closing body 3 has a T-shaped cross-section, having a cylindrical region 16 and a sealing head 17 formed as an integral part thereon. The cylindrical region 16 is guided in its assembled state in the first guide area 9 of the guide element 5, and the sealing head 17 is guided on the second guide area 10 on the inner faces of the arms 8. In the present exemplary embodiment, only three arms 8 are formed on the guide element 5. It should be mentioned, however, that the number of arms 8 is arbitrary, where at least two arms must be provided for reliable guidance. Since the transfer flow in the inlet valve 1 is in an axial direction X-X, however, the number of arms must not be too large or there will not be sufficient transfer areas on valve 1. As can be seen from FIG. 2, three transfer areas are obtained for three arms 8 on the guide element 5, each lying between two adjacent arms 8.

In addition, a spring seat 13 is formed on the guide element 5, on which rests the spring element 4, which is a helical spring. The spring element 4 rests at its other end on the lower face of the sealing head 17 (see FIG. 3).

A press fit is provided between the guide element 5 and the valve seat 2 to enable simple pre-assembly of the valve according to the invention. An annular groove 12 is formed in the valve seat 2 for this purpose, in which the ends of the three arms are inserted with a press fit, thereby enabling simple pre-assembly of the valve 1.

The operation of the valve 1 according to the invention is described below. The valve 1 is arranged between an intake line 21 and a line 22 that leads to the high-pressure pump, the line 22 branching off as a branch line from a line 23 that leads to the high-pressure area of the reservoir injection system. During the induction stroke of the pump, fuel is sucked in through the intake line 21, the closing body 3 being moved to the right by the negative pressure generated. As a result, the sealing head 17 lifts off from a flat seat 24 on the valve seat 2. This allows fuel to flow through the transfer areas between the arms 8 and the line 22 to the high-pressure pump. It should be mentioned in this case that a check valve is also arranged in the line 23 to the high-pressure area to prevent fuel from flowing back out of the high-pressure area to the high-pressure pump.

During the displacement stroke, the flow direction in the line 22 reverses, so that the closing body 3 is moved back to the left, and the sealing head 17 rests on the flat seat 24. The inlet valve 1 is thereby closed so that fuel can be delivered via the line 23 to the high-pressure area of the reservoir injection system. During the movements of the closing body 3 in the axial direction X-X, the closing body 3 is guided on the first guide area 9 and on the second guide area 10 respectively of the guide element 5. Since the two guide areas guide the respective ends of the closing body 3, tilting of the closing body or slight skewing out of line is prevented reliably. This ensures that during movement of the closing body 3, no unwanted edge stress occurs when coming to rest either on the flat seat 24 or on the end-stop 11. Thus material wear on the valve seat or the guide element 5 can also be prevented reliably, so that the risk of damage from abraded material to the pump or other components arranged downstream can be reduced significantly. The closing body 3 or the valve 1 has a relatively short overall axial length despite the dual guidance of the closing body 3 that enables reliable guidance without damage over the whole working life of the valve.

In addition, since the guide element 5 is made of plastic, there is no need for cost-intensive manufacturing procedures such as machining or manufacture by punching and deep drawing of the guide element. It should be mentioned, however, that the guide element 5 can of course still be made by the aforementioned manufacturing techniques.

Making the part out of plastic has the additional advantage, however, that the arms 8 of the guide element 5 are relatively elastic, so that high component stresses do not arise in the guide element 5 in assembly. In addition, it is simple to mount in the groove 12 of the valve seat.

A second exemplary embodiment according to the present invention is described below with reference to FIG. 4. Identical or functionally identical parts are given the same references as in the first exemplary embodiment.

Unlike the first exemplary embodiment, hydraulic damping on opening the valve is additionally integrated in the second exemplary embodiment. An additional step 18 is provided for this purpose on that side of the sealing head 17 facing the cylindrical region 16. In the assembled state this results in a fuel-filled chamber 19, as shown in FIG. 4, that performs the hydraulic damping on opening. As shown in FIG. 4, a gap 20 is provided between the chamber 19 and the area around the cylindrical shaft 16, via which the fuel in the chamber 19 can flow out as the valve opens. This achieves a particularly smooth opening of the valve, so that the working life of the valve can be extended even further. The additional seat 18 also doubles as a rest for the spring element 4 (see FIG. 4). Thus the valve according to the second exemplary embodiment also includes hydraulic damping during opening of the valve merely by forming this simple annular step 18. This can be used to reduce or completely eliminate the impact energy of the closing body 3 on the end-stop 11. The guide sleeve 5 can still be made of plastic by injection molding in this case.

To summarize, the present invention relates to an inlet or outlet valve (check valve) for a pump, comprising a closing body 3 pre-tensioned by a spring element 4. The closing body 3 can open or close a passage on a valve seat 2. The valve also comprises a guide element 5 for guiding the closing body 3. The closing body 3 is guided inside the guide element 5 at its two ends 9,10.

The present invention is not restricted to the exemplary embodiments shown. Different variations and modifications can be implemented without going outside the scope of the invention.

We claim:

1. An inlet or outlet pump valve, said pump valve comprising:
   a pump valve closing body having a guiding portion and a closing cylinder with a flat closing face, said face including a perimeter, said closing body pre-tensioned by a spring element such that movement of said closing body can open or close a passage at least partially defined by a flat valve seat;
   and
   a pump valve guide element connected to the valve seat by means of a press fit, the pump valve guide element including:
   a cylindrical portion having a length in a first direction, wherein at least a portion of the spring element is disposed within the cylindrical portion; and
   a plurality of arms disposed outwardly of an external circumference of the cylindrical portion and extending in the first direction along and beyond the length of the cylindrical portion;
   wherein the guiding portion of the pump valve closing body is guided inside a first guide area defined by an opening formed in the cylindrical portion of the pump valve guide element, and wherein an end of the closing cylinder of the pump valve closing body is guided inside a second guide area defined by the plural arms of the pump valve guide element, such that the perimeter is in physical contact with each of the plurality of arms; and
   wherein the pump valve is configured to allow a transfer flow in the axial direction.

2. The pump valve as claimed in claim 1, wherein the guide element is made of plastic.

3. The pump valve as claimed in claim 1, wherein the guide element is mounted in a recess formed in the valve seat.

4. The pump valve as claimed in claim 1, wherein the guide element has an end-stop surface for a limit of travel of the closing body.

5. The pump valve as claimed in claim 1, wherein the guide element has a spring seat configured to support and center the spring element.

6. The pump valve as claimed in claim 1, wherein the guide element has exactly three arms, and wherein a transfer port in the axial direction is formed between each pair of adjacent arms.

7. The pump valve as claimed in claim 1, wherein the guiding portion of the closing body is a cylindrical shaft that is guided by the first guide area.

8. The pump valve as claimed in claim 1, wherein the closing body has a flat sealing head that is guided along its sides by the second guide area.

9. The pump valve as claimed in claim 1, wherein the closing body has a sealing head with a frustro-conical shaped indention formed in one end.

10. The pump valve as claimed in claim 1, wherein:
    the guide element includes an end-stop surface for limiting the travel of the closing body; and
    the closing body includes an annular step configured to form a fuel-filled chamber between the step and the end-stop surface of the guide element for hydraulic damping of a movement of the closing body.

11. The pump valve as claimed in claim 1, wherein the pump valve is configured for use as an inlet valve in a piston fuel pump.

* * * * *